March 24, 1936.  P. KOLLSMAN  2,034,909
UNIVERSALLY BALANCED AIRCRAFT INDICATOR
Filed March 18, 1931   2 Sheets-Sheet 1
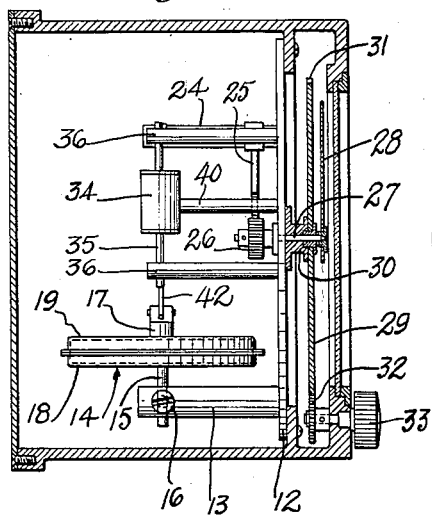
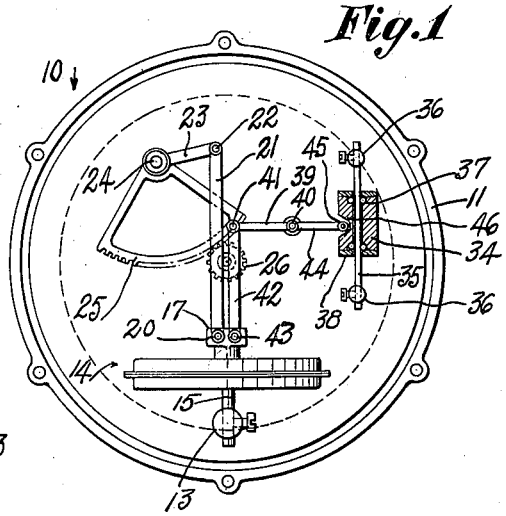
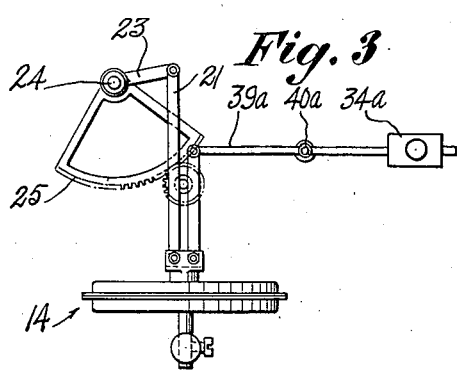
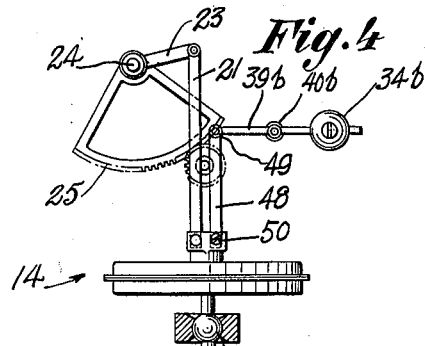
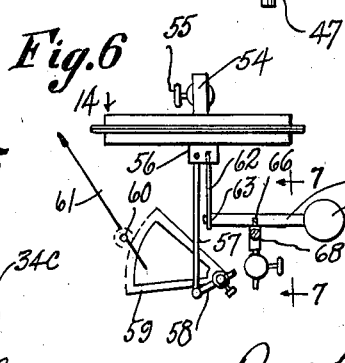
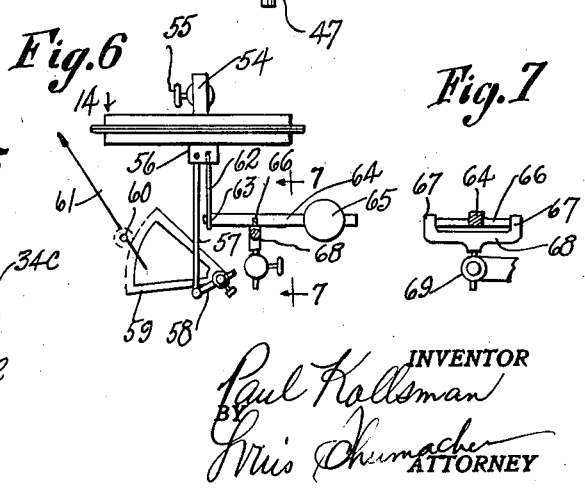
INVENTOR
Paul Kollsman
BY
ATTORNEY March 24, 1936.　　　　P. KOLLSMAN　　　　2,034,909
UNIVERSALLY BALANCED AIRCRAFT INDICATOR
Filed March 18, 1931　　2 Sheets-Sheet 2

INVENTOR
Paul Kollsman
BY
Miss Schumacher
ATTORNEY

Patented Mar. 24, 1936

2,034,909

UNITED STATES PATENT OFFICE 2,034,909

UNIVERSALLY BALANCED AIRCRAFT INDICATOR

Paul Kollsman, Woodhaven, N. Y.

Application March 18, 1931, Serial No. 523,423

25 Claims. (Cl. 73—4)

This invention relates to indicators which are subject to excessive vibration as in aircraft, or the like.

In such instruments moving parts are subject to considerable vibration, and especially where one or more moving parts of relatively considerable mass, depending on the delicacy of the instrument, are movable in the same direction, or in such directions that their inertia is cumulative, eventual damage or loss in sensitivity of the instrument results. By providing means for counterbalancing the weight or mass of such part or parts with respect to the directions of movement thereof, the vibrations are counteracted and substantially "killed". Thus in an instrument such as an altimeter having an aneroid, expansible and contractible in a given path, if a mass be provided which is the equivalent of the mass of the moving part of the aneroid, and/or similarly moving coacting parts, the effect of vibration will be to cause the aneroid, etc., and the mass referred to, to vibrate synchronously in parallel directions or relations, so that they are instantly and continuously balanced, whereby vibrations in the instrument are prevented. The counterbalancing weights being equal, the accelerations produced by the same vibrational impulses are also equal. Thus strains, distortion and even incorrect reading of a sensitive instrument may be prevented. By properly distributing the vibrational stresses, in the novel manner hereinafter described, certain delicate bearings of the instrument are not subjected to any greater wear even with the provision of the counterbalancing mass.

In such instruments, moreover, the weight of the parts, mechanism or both acts differently in the different positions of the indicator, and so affects the accuracy of the readings. Particularly is that true in the case of an altimeter which is a highly sensitive device operated by a pressure sensitive means, such as an aneroid. In the altimeter the weight of the aneroid and mechanism operated thereby, may in certain position of the instrument be neutralized by the mounting, and in other angularly different positions, may act so as to influence the expansion of the aneroid and hence affect the reading.

It is therefore an object of this invention to provide an improved indicator which is balanced against vibration, and another object of the invention is to prevent the action of gravity from influencing the readings due to vibrations and/or at different positions of angularity or rotation of the indicator.

This invention, furthermore, has reference to instruments of a delicate type in which an extreme accuracy in the bearings is essential and must be maintained despite the constant movement of the mechanism and the possible effects of vibration, the latter being an important factor in aircraft instruments.

It is therefore another object of the invention to provide an indicator wherein improved balancing means are provided which may be mounted independently or separately of the indicator mechanism, or which, in a general sense, is so arranged as not to exert any extra strain or weight on the elements or bearings of the mechanism so as to avoid an increased friction, with a consequently decreased sensitivity and a shorter effective life of the device.

A further object of the invention is to furnish an indicator of the character described having a weight counterbalancing means which is arranged in an improved manner for a comparatively constant or uniform correction; and which consists of relatively few and simple parts, which are inexpensive to manufacture and assemble, and which is durable, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in rear elevation of a device embodying the invention with parts in section, the rear plate being removed.

Fig. 2 is a view thereof in side elevation, with the casing and other parts in section.

Fig. 3 is a plan view of a modification of the invention.

Fig. 4 is a plan view of another modification including a movably mounted aneroid.

Fig. 5 is a plan view of a further modification of the invention, with a movably mounted aneroid.

Fig. 6 is a plan view of a further modification of the invention.

Fig. 7 is a sectional view taken on line 7—7 of Fig. 6.

Figure 8:
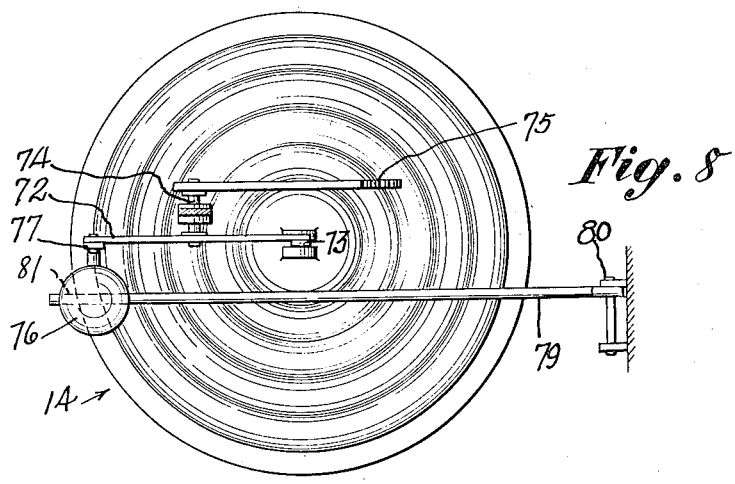
Fig. 8 is a top plan view of another modification of the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

Generally described, this invention provides an instrument which is so balanced as to be unaffected by the weight of its parts, when subject to vibration and also when the instrument is turned angularly. This instrument may include a suitable ultimate actuator, such as a means which is sensitive to temperature, pressure, or the like, and which includes a body or portion which is movable under the action of gravity in certain positions of the instrument. In an altimeter, an aneroid may be employed which is expansible in a given direction. If the weight of the aneroid is free to act in that direction, a plus or minus error will occur in the reading dependent on the vibrations and on the angular position of the instrument. This error may be aggravated by the weight of the mechanism to a degree dependent upon the construction of the mechanism and its inherent balancing qualities. The counterbalancing means are preferably so arranged as to avoid the addition of any increased weight or strain on the delicate parts of the indicator mechanism, for which reason said means are preferably independently mounted, and may also separately engage the pressure sensitive device. It is also desired that the counterbalancing means may act uniformly or in a comparatively constant ratio or relation to the weight factor of the indicating mechanism of the instrument, so as to assure accuracy throughout in the readings. The weight factor may be defined as that weight which is effective in altering the readings of the indicator, under vibrations or with angular positional changes thereof. An ideal arrangement of the counterbalancing means is to so arrange a weight, or the equivalent, as to cause it to move with the deformation of the pressure sensitive device, or a part thereof, and in parallelism to the direction of movement thereof, and without changing the relation of the counterbalancing weight in a direction at right angles to the direction of movement of the pressure sensitive device; in other words, the moment, if any, of the weight is maintained substantially constant. The term moment as herein used signifies the product of a mass by the shortest horizontal distance from the pivot to a vertical plane passing through the center of gravity of the mass when mounted on a pivoted element or engaged for movement thereby at a substantially constant distance from said pivot. The moment becomes zero when the center of gravity is in the vertical plane passing through the pivot. While various connections may be used, preferably a pivoted element in the form of a lever which is the actuating part, so that simplicity is assured, and yet the arrangement is such that the moments of the lever arms are always in practically the same ratio to each other. When the instrument is in a position so that the weight of the aneroid will not affect the reading, the counterbalancing weight is preferably taken up by a suitable part or bearing in order not to affect the reading. The invention herein described is applicable to indicators which may be rotatable and have a stationary dial, as described in my Patent No. 1,741,704, patented December 31st, 1929; indicators having a rotatable dial; indicators which are mounted for setting rotation in a suitable casing; and airplane instruments which may be mounted in a stationary manner.

Referring in detail to the drawings, 10 denotes a device embodying the invention. The same may include any suitable indicator, such as an altimeter, which is here shown in an illustrative and not in a limiting sense. This indicator may include any casing 11 which may have a mounting plate 12 carrying a support such as a post 13. On the latter may be mounted a conventional aneroid 14 having a fixed center pin 15 that may be longitudinally adjustably positioned in a hole in the post 13 and secured by a set screw 16. Extending oppositely from the aneroid, and in alined relation with the pin 15, is a second pin or connection 17 rigidly connected to the aneroid. Specifically, the aneroid has a pair of opposite circular walls 18, 19 to which said pins are respectively separately secured. Connected to the pin 17 pivotally at 20 is a link 21, whose other end is pivotally connected at 22 to a short arm 23 that may be secured to a shaft 24. Also secured to said shaft may be a gear segment 25, the teeth of which mesh with those of a pinion 26 which is mounted on a spindle 27 journaled in the plate 12. This spindle may carry a pointer 28, which may coact with a dial 29 that is rotatably mounted on a stationary bearing element 30. The dial may have its circular edge toothed at 31 to form a gear, the teeth of which may mesh with those of a pinion 32 that may be turned by a knob 33 for setting the device. The construction hereinbefore described is intended to be merely conventional, for the purpose of illustrating the invention. The elements 24, 25, 26 may be denominated a rotary means for operating the pointer.

It will now be perceived that when the instrument is held in such position, that the axis of the aneroid is vertical, the weight of the aneroid and also that of certain parts of the mechanism, including, for instance, the link 21, function to affect the expansive position of the aneroid. More particularly, in the position shown, the reading will be less than standard; while, if the instrument is turned through an angle of 180 degrees, the reading will be greater than the standard. But if the instrument is held with the axis of the aneroid in a horizontal position, the weight of the aneroid and associated parts is largely assumed by the mounting and will not affect the instrument. The first position may, for convenience, be denominated the angular gravity factor position, and the second position may be called the position of standard operation. However, it will be understood that vibrational impulses may act on the aneroid in any angular position thereof.

Now it is the object of this invention to provide an indicator balanced against vibrations and having a universal position of standard operation, or one that is nearly so, and to do this substantially without additional wear on the bearings, strain on the parts, or provision of many additional bearings. By the term universal position of standard operation is meant that the instrument will have such characteristics as will cause it to operate accurately in any position in which it may be turned, without being subject to inaccuracies due to the unbalanced condition therein. The means provided is a weight counterbalancing means, which is preferable to a spring for this purpose, and may be arranged to function by means of links, levers, pulleys or other well known power transmitting means. The counterbalancing means will be seen to be carried solely by a bearing means when the aneroid axis is horizontal, but in positions of the axis intermediate between the vertical and horizontal, the counterbalancing means may operate substantially in proportion to the angle or weight to be counteracted. However, the inertia of the counterbalancing means is available to counteract the effect of vibrations on the aneroid, even when the axis of the latter is horizontal.

34 designates a suitable weight which may be mounted for sliding movement along a member such as a stationary bar 35 that is parallel to the axis or direction of movement of the aneroid, said bar being mounted on any suitable support 36. The weight 34 may be arranged to move with a minimum of friction, for instance, by means of ball bearings 37 which may ride along the bar, and are set into suitable races and retained by plates 38 or the like.

To cause the weight 34 to move in opposite direction relative to the aneroid, means such as a lever 39 may be provided, having a fixed pivot 40 and pivotally connected to link 21 but preferably to the aneroid, for instance, at 41 by a link 42, the link being movably connected to the member 17 of the aneroid by a pivot 43. The lever arm between 40 and 41 is preferably longer than link 23. The lever 39 has movable connection with the weight so as to engage the same irrespective of any change in the effective length of the arm 44; for this purpose, said arm may have a roller 45 which may engage in a suitable curved recess 46. The weight 34 is thus movable by the aneroid preferably independently of the connections and bearings provided for the transmitting motion to the pointer 28; and obviously the bearings at 41, 43 and 45, 46 need not have the extreme degree of accuracy required in the former, and may also be made larger and more rugged. Thus the sensitivity and life of the instrument may be unaffected.

This device represents an ideal arrangement, the principle of which is that the weight 34 moves in constant parallelism to the path of movement of the aneroid, so that the moment arms are unchanged. By the term "moment" as here used is meant, specifically, first, the product of the mass of counterweight 34 by the perpendicular distance or moment arm from the axis at 40 to the path of the center of gravity of the counterweight along guide 35; and second, the mass of the aneroid 14 and associated part to be counterbalanced multiplied by the distance or moment arm from the axis at 40 to the vertical plane along which the path of movement of the center of gravity of these parts extend. If the aneroid is considered alone, such path may be determined by the axis of the aneroid. Furthermore, when the device is in the position of standard operation, the weight is carried solely by the bar 35, which is then horizontal. In intermediate positions, a suitable component of the weight exerts its counterbalancing action on the aneroid.

It will be apparent that the instrument will function equally well if the pressure sensitive means 14 be a device filled with a fluid that is evaporated or expanded by heat.

In Fig. 3 is a modification of the invention, which is generally similar to that hereinbefore described, except that the weight 34a is directly carried by the pivoted means or lever 39a having the fixed pivot 40a. In this device, the lever arm at 39a is preferably of considerable or sufficient length, greater than that of link 23, so that the weight will have a relatively small angle of movement, this being for the purpose that when the device is near the position of standard operation, the weight will be carried to as large a degree as possible by the pivot 40a, and also for substantially parallel movement with the direction of expansion of the aneroid.

In Fig. 4 is shown a modification of the invention which is generally similar to that of Fig. 3 with the primary exception that the aneroid is mounted on a pivotal or ball joint 47 which may be affixed to a suitable support such as 13 of Fig. 1. Consequently the lever 39b, which may here be shorter, is connected to the aneroid by a relatively stationary pivot means, which may include a member 48 having a pivotal connection at 49 and a rigid connection with the aneroid at 50. Now, when the aneroid deforms, it swings slightly about its pivot 47, as determined by the fixed pivot 40b and the lever 39b connected thereto. Thus the moment of the weight 34b may be maintained in substantially constant relation with the moment of the effective weight of the aneroid and its associated parts as explained for Fig. 1. By suitably calibrating the instrument, accuracy of the instrument is obtained.

In Fig. 5 is shown a further modification which is generally similar to that of Fig. 4 except that the aneroid is mounted on a leaf spring 51, which eliminates the bearing 47. The weight 34c may be adjusted along the lever 39c by a set screw 52. The said lever may have a fixed pivot 40c and may be directly rigidly connected at 53 to the aneroid or the member 17 thereof. By proper calibration of the instrument any variation which may be due to change the effective length of the spring 51, incidental to the deformation thereof, is taken care of. The operation of the device is the same as that of the one shown in Fig. 4. By reason of the fact that the lever arm at 39c is longer than arm 23, the weight moves through a small angle and hence substantially parallel to the path of movement of the aneroid. The length of the lever arm between 40c and the weight will merely affect the required size of the weight.

In Figs. 6 and 7 is shown a further modification wherein the aneroid 14 may be mounted at one side thereof on a rigid stationary post 54, in adjustable relation thereto, as by a set screw 55. On the opposite side of the aneroid is a block 56 to which is connected a link 57, joined to an adjustable link 58 for operating a gear segment 59 and hence a pinion 60 for the pointer 61.

Secured to the block 56 is a leaf spring 62 which may be rigidly connected at 63 to a lever 64 carrying a counterweight 65. To pivotally mount the lever, a leaf spring 66 is provided rigidly mounted at its ends in the arms 67 of a fork 68, which is adjustably mounted in a support 69. The leaf spring 66 is disposed flatwise in a plane parallel to that of the leaf spring 62 and the aneroid axis, but extends lengthwise at an angle thereto. The lever 64 is rigidly connected to said leaf spring 66, as by receiving the same in a notch or slot in an edge of the lever. Thus the device operates with a minimum of bearings and friction.

Figure 9:
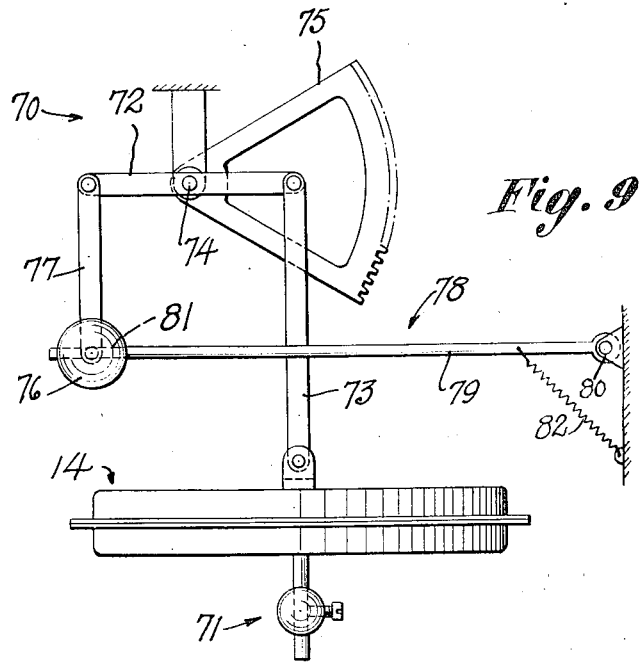
Fig. 9 is a view in side elevation thereof.

The terms weight and gravity as employed herein are used with respect to the effects produced thereby in vibration and also in various angular positions as aforementioned. It will be noted that in the devices of Figs. 1 to 7, the counterweight lever is wholly independent of the indicator actuating means, so as not to increase the stress and wear thereon, and to permit a different angular motion of the counterweight. In the device of Figs. 8 and 9 that will now be described, the lever 79 and pivot 80 are independent, reducing wear and permitting the employment of a very long lever in a compact arrangement.

In Figs. 8 and 9 is shown a further modification 70 of the invention including a counterbalancing weight together with non sliding means for guiding the weight for movement in a fixed path in substantial parallelism to the direction of expansion of the aneroid. In this way friction is eliminated, uniformity in counterbalancing action assured, and the weight positively retained in position so as to be unaffected by a turn of the aircraft or rotation of the indicator, while being subject to a minimum degree to the action of vibration.

The device 70 includes a pressure sensitive instrumentality such as an aneroid 14 which may be relatively fixedly mounted at 71, and having a means, or lever 72 connected thereto in any suitable manner, as by a link 73. The lever may have a relatively fixed pivot or shaft 74, which may operate the indicator pointer by any drive, gear segment 75 of which is shown. Coacting with the means 72 is a counter weight 76 which acts substantially parallel to the direction of expansion of the aneroid. The weight 76 may be movably connected with the means 72, as by a link 77. Secured to the weight is a device 78 having a long arm 79 suitably movably mounted so that the movement of the weight causes a movement of said arm, and the latter in turn causes the movement of the weight to occur in a fixed path. Thus the members 72, 73, 77, and 79 constitute a control means for the counterweight. The arm 79 may be in the nature of a leaf spring or rigid rod pivotally mounted at 80 and relatively fixedly connected to the weight at 81. Obviously the arm 79 may be of different lengths, but the longer the arm, the greater the accuracy in the maintenance of a uniform moment arm of the weight with respect to the aneroid. In any case, the arm 79 may be considered as a portion of the means for interconnecting the actuator 14 with the pivoted or rotary means or with the counterweight since such interconnecting or interassociating means causes the pivoted means and counterweight to have a smaller angle of motion than the rotary means, with the counterweight moving substantially parallel to the path of the actuator. Said arm may extend at any angle to the path of movement of said instrumentality, and preferably in perpendicular relation to the path. The bearing pressure on the pivot at 74 occurs only in the direction of the path of movement of the aneroid. Preferably said arm is several times the length of the said moment arm to afford a large radius, and the length of the arm is necessarily limited by the size of the instrument in which it is embodied. By disposing said arm so as to cross the aneroid axis, a high degree of compactness is assured. The arm may have sufficient lateral rigidity throughout and at the mounting 80 to support the weight in a direction at right angles to the aneroid axis. It will be noted that the gear segment 75 may be separately connected with the aneroid as by links 21 or 57 hereinbefore described, and prevent vibration of the counterweight. A spring 82 serves to take up any play in the bearings of the link 77 and arm 79.

It will be noted that in this invention, a rotary means such as 25, 26, for the pointer is coupled with a pivoted means such as 39a, 79 or the like, for the counterweight, in coordination with means such as 21, 23, 42 or 72, 73, 77 or the like, so interconnecting the same with the aneroid that the pivoted means is movable through a substantially smaller angle than the rotary means, and the center of gravity of the counterweight being movable in substantial parallelism with the center of gravity of the moving parts whose weight is to be counterbalanced.

It will be appreciated that various changes and modifications may be made in the device as shown in the drawings, and that the same is submitted in an illustrative and not in a limiting sense, the scope of the invention being defined in the following claims.

I claim:

1. A device including an element deformable in response to varying stress conditions thereon, indicating means operated by said element, a lever connected to the element and having a fixed pivot, a weight on the lever, and a resilient means supporting the element, said resilient means being deformable substantially only as determined by the lever and the fixed pivot thereof.

2. In an aneroid altimeter, a pointer, a scale concentric therewith, an aneroid and rotary means responsive to the aneroid for actuating the pointer, a pivoted means, a counterweight for the aneroid connected to said pivoted means so that the center of gravity of the counterweight is positively maintained at a substantially constant fixed distance from the path of expansion of the aneroid, and means interconnecting the pivoted means and rotary means with the aneroid so that the former is movable through a smaller angle than the rotary means with the counterweight moving substantially parallel to the path of expansion of the aneroid in any angular position of the altimeter with respect to a horizontal plane, and said pointer having a fixed axis of rotation independent of the pivoted means and interconnecting means.

3. An altimeter including an aneroid, a pointer having a fixed axis of rotation, rotary means for actuating the pointer, a counterweight for the aneroid, pivoted means, the counterweight being rigidly connected to the pivoted means, and means interconnecting the rotary means and pivoted means with the aneroid at one side thereof, the interconnecting means being adapted to move the pivoted means through a smaller angle than the rotary means, and the aneroid being normally fixedly mounted at the opposite side thereof.

4. An altimeter adapted for assuming different angular positions with respect to a horizontal plane including an aneroid, a rotatable pointer, rotary means for actuating the pointer, a pivoted means, a counterweight engaged with the pivoted means so that its center of gravity is in constantly fixed relation to the pivot of the pivoted means, and means interconnecting the rotary and pivoted means with the aneroid so that the counterweight moves through a substantially smaller angle than the rotary means, and the pointer and pivoted means having fixed parallel axes.

5. An altimeter including an aneroid, a rotatable pointer, a scale therefor, rotary means for actuating the pointer, a pivoted means, a counterweight substantially rigidly connected thereto, and means interengaging the rotary means and the pivoted means so that the counterweight is movable through a smaller angle than the rotary means, said pivoted means including an arm having a fixed pivotal connection at one end and carrying the counterweight adjacent to its other end, and the interengaging means including a link connected with the last mentioned end of the arm at an angle thereto.

6. An altimeter including an aneroid, a rotatable pointer, a scale therefor, mechanism for interconnecting the pointer and aneroid, a counterweight for the aneroid and mechanism, and means for causing the counterweight to move in a path approximately parallel to the path of expansion of the aneroid, said means including an arm elongated transversely to a line determined by the axis of the aneroid and having a fixed pivot on one side of the said axis, said counterweight being associated with the arm on the opposite side of said axis, and a link movably associated with the arm in proximity to the counterweight, the link extending in the general direction of said axis and being actuated simultaneously with said mechanism by the aneroid.

7. A device including a pointer, an aneroid, a first and a second link extending in the general direction of the axis of the aneroid, a lever having a fixed axis interconnecting said links, the first of said links being connected to the aneroid, an arm of substantial length extending transversely of the aneroid axis on opposite sides thereof, the second of said links being connected to the arm on one side of the aneroid axis, the arm having a fixed pivot on the opposite side of the aneroid axis and remotely from the second link, and a counterweight for the aneroid associated with the arm in proximity to the second link, and means for actuating the pointer responsive to the aneroid.

8. A device including an aneroid deformable in one path, a stationary pivotal mounting for the aneroid, indicating means connected to and operated by the aneroid, a counterweight, a lever on which the counterweight is substantially fixedly mounted, said lever having an independent stationary pivot and being engaged with the aneroid so that a deformation of the aneroid causes a pivotal movement of the aneroid and lever and a movement of the weight substantially parallel to the path of deformation of the aneroid.

9. The combination with an altimeter having an aneroid, a rotatable indicating element, and mechanism including a rotary device and a member for operating the same actuated by the aneroid substantially parallel to the path of expansion thereof for causing the rotary device to actuate the indicating element, of a weight for counterbalancing the action of gravity on the aneroid and member, and pivoted means for carrying and causing the weight to move in a fixed path in the general direction of the path of expansion of the aneroid with the pivoted means having a substantially smaller angle of motion than the rotary device, said means positively preventing movement of the weight in any other direction.

10. An altimeter adapted for operation in any position of angularity with the horizontal and having an aneroid, mechanism including an elongated member connected at one end to the aneroid, said member extending longitudinally of and being movable generally parallel to the path of deformation of the aneroid, said altimeter having a counterweight for the aneroid and member, an indicating element, said mechanism including a rotary means connected to said member for moving the indicating element, a pivoted means, the counterweight being connected to the pivoted means so that the center of gravity of the counterweight is constantly maintained at an approximately constant distance from the axis of the pivoted means, and means interconnecting the pivoted means with the aneroid so that the pivoted means is movable through a substantially smaller angle than the rotary means to cause the counterweight to move approximately parallel to the path of deformation of the aneroid.

11. In an aneroid altimeter, a rotatable indicating element, an aneroid, and mechanism interconnecting the indicating element and aneroid, said mechanism including an elongated member extending in the direction of the path of deformation of the aneroid and being connected at one end thereto and being movable parallel to said path, said altimeter having a counterbalancing weight for the aneroid and member, said mechanism including a rotary means connected to the member for moving the indicating element in response to the aneroid, a pivoted means, the counterbalancing weight being rigidly engaged to the pivoted means, and means interconnecting the pivoted means with the aneroid so that the former is movable through a smaller angle than the rotary means with the counterbalancing weight being movable approximately parallel to the path of deformation of the aneroid, and the interconnecting means having movable coaction with the aneroid so that the latter is free to expand along its path.

12. A device including an aneroid, a rotatable indicating element, a dial concentric therewith, mechanism including rotary means and an actuator element connected to the aneroid for operating rotary means to rotate the element, the indicating element having an axis perpendicular to the dial, the aneroid having a path of deformation movement parallel to the dial, the mechanism being disposed at one side of the aneroid, and a counterbalancing weight disposed at said side and being movable in a fixed path substantially parallel to said dial and so that the center of gravity of the weight is at a substantially constant distance from the path of deformation of the aneroid in any angular position of the device with respect to the horizontal, a pivoted means interengaging the aneroid and the counterbalancing weight for actuating the latter, so that the counterbalancing weight is movable through a smaller angle than the rotary means, and the counterbalancing weight being in fixed relation to the pivoted means whereby the counterbalancing weight is movable approximately parallel to the path of deformation of the aneroid in different angular positions of the device.

13. A device including an aneroid, a rotatable indicating element, rotary means for actuating the element, a lever means, a counterweight for the aneroid substantially rigidly connected to the lever means, and means including a linkage interconnecting the rotary and lever means with the aneroid so as to cause the counterweight to be moved by the lever through a smaller angle than the rotary means and in approximate parallelism with the path of movement of the aneroid, and a resilient element coacting with said lever means for applying a force thereto to substantially prevent vibration thereof.

14. A device including an indicating means, and means including an aneroid expansible along a single path, and actuating means operatively interconnecting the indicating means and aneroid, a counterbalancing weight for the aneroid, and swingable means interengaging the second mentioned means and the counterbalancing weight for causing a movement of the latter approximately parallel to said path, and for preventing movement of the counterbalancing weight in any other direction, the swingable means being supported for swinging movement about an axis independent of the first mentioned means, whereby friction caused by movement of the swingable means does not affect the indications of the indicating means.

15. An aircraft altimeter including a rotary indicator, an aneroid expansible along a substantially straight path, actuator means including a rotary member whereby the aneroid causes movement of the indicator, a counterweight for the aneroid, and pivoted means to render the counterweight effective against said aneroid, said pivoted means being so associated with the actuator means that the counterweight has a lesser angular motion than the rotary member, said counterweight being in such relatively fixed relation to the pivoted means that the path of the counterweight is maintained at a substantially fixed distance from the path of said aneroid in any angular relation of the altimeter to a horizontal plane.

16. A device including a member adapted for movement along a given path, an angularly movable indicating element, a rotary means for operating the same controlled by said member, a counterweight for the latter, operating means for the counterweight including means interconnecting the member with the counterweight for movement thereof by the member, and an arm of substantial length having at one end a pivotal axis substantially at right angles to said path and having its other end associated with the counterweight to guide the same for movement along a large radius arc in substantially parallel relation to said path, said arm having a substantially smaller angular movement than the rotary means, and the operating means having a yielding means to prevent vibration of said arm and counterweight.

17. A device including a diaphragm element deformable along a given path, a rotary means controlled thereby for actuating an indicator, a counterweight for the diaphragm element, a member mounted for pivotal movement about a relatively fixed axis extending generally at right angles to said path, said member rigidly carrying said counterweight remotely from said axis, and means actuated by said diaphragm element and actuating said member substantially at said counterweight to cause pivotal movement of the member, and the length of the latter between the pivot thereof and the counterweight being such that the counterweight has a lesser angular motion than the rotary means, whereby the counterweight moves approximately parallel to the path of deformation of said diaphragm.

18. An indicator device including a sensitive element responsive to variable forces for movement along a given path, a counterweight for the element, a relatively long member mounted for pivotal movement at one end about a relatively fixed axis extending generally at right angles to said path, said member having said counterweight mounted thereon substantially at the other end of the member with the center of gravity of the counterweight maintained at a substantially fixed distance from said axis, and means actuated by said element and actuating said member substantially at the last mentioned end of said member to cause pivotal movement of the member, whereby the counterweight moves approximately parallel to the path of deformation of said element, as set forth.

19. A sensitive indicator device including a rotary indicator, an element responsive along a given substantially straight path, to variable forces, rotary indicator operating means actuated by said element and having a fixed rotary shaft for said indicator, a counterweight for the element movable in the general direction of said path, means for causing movement of said counterweight generally parallel to said path and for preventing movement of the counterweight in any other direction, including pivotal means actuated by said element and being connected thereto so as to be otherwise wholly independent of the rotary means, said pivotal means and said element being mounted in relatively rigid relation to each other, and the pivotal means being arranged and constructed to have a lesser degree of angular motion than the rotary means, so that the counterweight moves constantly approximately parallel to said path, as set forth.

20. A device including a member movable along a path, an indicator, rotary means for operating the indicator, a lever having a fixed pivot at one end, a counterweight for the member connected to the lever adjacent to an opposite end thereof, and means interconnecting the rotary means and the lever with the member, the interconnecting means being connected to the lever substantially at the counterweight, and the lever being relatively long, so that the counterweight is moved through a substantially smaller angle than the rotary means and in approximate parallelism with the path of said member.

21. A device including a member movable along a path, an indicator, rotary means for operating the indicator, a counterweight for the member, means for guiding said counterweight for movement approximately parallel to said path, including a lever, and means interconnecting the rotary means and lever with the member so as to cause the counterweight to be moved by the lever through a smaller angle than the rotary means in the approximate parallel relation to said path, and resilient means coacting with the guide means for applying a force thereto to substantially prevent vibration thereof.

22. A device including a member movable along a path, an indicator, rotary means for operating the indicator, a counterweight for the member, means for guiding said counterweight for movement approximately parallel to said path, including a lever, and means including members independently interconnecting the rotary means and lever with the member so as to cause the counterweight to be moved by the lever through a smaller angle than the rotary means separately of the latter and in the approximate parallel relation to said path, and said lever and rotary means being independently mounted.

23. A device including a rotary indicating means, and means including a pressure sensitive element expansible along a single path, and actuating means operatively interconnecting the indicating means and the element and including a fixed rotary shaft for mounting said actuating means, a counterbalancing weight for the element, and operating means for the counterbalancing weight including link means pivotally interengaging the rotary shaft and the counterbalancing weight, and means for causing such association between the interengaging means and the counterbalancing weight as to cause movement of the latter by the interengaging means approximately parallel to said path, and for preventing movement of the counterbalancing weight in any other direction, and the operating means being so associated with the actuating means as to cause the movement of the counterbalancing weight to be substantially less than that of the indicating means, whereby the effect of gravity on the element is counteracted.

24. A device of the character described including a spring deformable along a given path, an angularly movable indicating element, a rotary means therefor controlled by the spring said rotary means including a shaft for said element having a fixed axis of rotation, a counterweight for the spring, linkage means interconnecting the latter with the counterweight for movement by the spring, and a separate independently mounted arm of substantial length having at one end a pivotal mounting the axis of which is substantially at right angles to said path and parallel to said shaft and having its other end associated with the counterweight to guide the same for movement substantially parallel to the path of deformation of the spring, and the counterweight having a smaller angular movement than the rotary means.

25. A device including an element deformable along a single path, an indicating means, mechanism including a rotary actuating means therefor, a counterweight for the element, means with which the counterweight is engaged for movement substantially parallel to said path, including a pivoted means, and means interconnecting the mechanism and the pivoted means, the mechanism and the interconnecting means including a plurality of links extending longitudinally substantially parallel to said path and being separately connected at one end to the element, one of the links being connected to the rotary means and the other to the pivoted means, for causing individual operation of the indicating and pivoted means, the pivoted means having a smaller angular movement than the rotary means.

PAUL KOLLSMAN.